(12) United States Patent
Barrett et al.

(10) Patent No.: US 11,981,203 B2
(45) Date of Patent: May 14, 2024

(54) INTELLIGENT ADAPTATIVE CRUISE CONTROL INTEGRATED ENGINE CONTROL

(71) Applicant: Ford Global Technologies, LLC, Dearborn, MI (US)

(72) Inventors: Jordan Barrett, Milford, MI (US); Keith Weston, Canton, MI (US); Brendan Francis Diamond, Grosse Pointe, MI (US); Andrew Denis Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/674,979

(22) Filed: Feb. 18, 2022

(65) Prior Publication Data

US 2023/0264569 A1    Aug. 24, 2023

(51) Int. Cl.
*B60K 31/00* (2006.01)
*B60W 30/14* (2006.01)

(52) U.S. Cl.
CPC ...... *B60K 31/0008* (2013.01); *B60K 31/0066* (2013.01); *B60W 30/14* (2013.01); *B60K 2031/0025* (2013.01)

(58) Field of Classification Search
None
See application file for complete search history.

(56) References Cited

U.S. PATENT DOCUMENTS

| | | | |
|---|---|---|---|
| 8,165,774 B2 | 4/2012 | Wang et al. | |
| 8,825,345 B2* | 9/2014 | Ellis | B60W 10/06 |
| | | | 701/112 |
| 9,212,616 B2 | 12/2015 | Schwindt | |
| 10,119,488 B2* | 11/2018 | Roos | B60W 30/18072 |
| 2020/0010074 A1 | 1/2020 | Follen et al. | |
| 2021/0095609 A1 | 4/2021 | Makied et al. | |
| 2022/0032770 A1* | 2/2022 | Hayashi | F02N 11/0837 |

FOREIGN PATENT DOCUMENTS

CN          112208527 A       1/2021

* cited by examiner

*Primary Examiner* — Todd Melton
(74) *Attorney, Agent, or Firm* — Frank A. MacKenzie; Bejin Bieneman PLC

(57) ABSTRACT

A system comprises a computer having a processor and a memory, the memory storing instructions executable by the processor to monitor conditions of a roadway as a vehicle travels the roadway while an adaptive cruise control feature of the vehicle is active, identify an expected condition change based on the monitoring the conditions of the roadway, determine a preferred power state for an engine of the vehicle based on the expected condition change, determine that an engine power state transition is planned for the engine, the engine power state transition including transitioning the engine from a current power state to a planned power state, and resolve the engine power state transition based on the preferred power state.

20 Claims, 5 Drawing Sheets

INTELLIGENT ADAPTATIVE CRUISE CONTROL INTEGRATED ENGINE CONTROL

BACKGROUND

Adaptive cruise control is a vehicle feature that, when engaged, controls vehicle propulsion power/acceleration in order to maintain a set speed when possible, while monitoring the road in front of the vehicle in order to detect other vehicles that may be present. When the adaptive cruise control feature detects the presence of a slower-moving vehicle in front of the controlled vehicle, it can reduce the speed of the controlled vehicle below the set speed in order to maintain a specified minimum following distance. Subsequently, if the adaptive cruise control feature detects that the road in front of the vehicle has become clear, it can cause the vehicle to accelerate back up to the set speed.

A vehicle can include an electrical energy source (such as a battery) and an engine that can be stopped and started while the vehicle is in motion. When the engine is stopped while the vehicle is in motion, such a vehicle can operate in an "electric only" mode in which the electrical energy source provides the power used for propulsion. The operational state of the engine can be controlled via stop (or "pull-down") and start (or "pull-up") commands (e.g., issued by a controller) as appropriate as the power demands of the vehicle vary over time.

DETAILED DESCRIPTION

Figure 1:
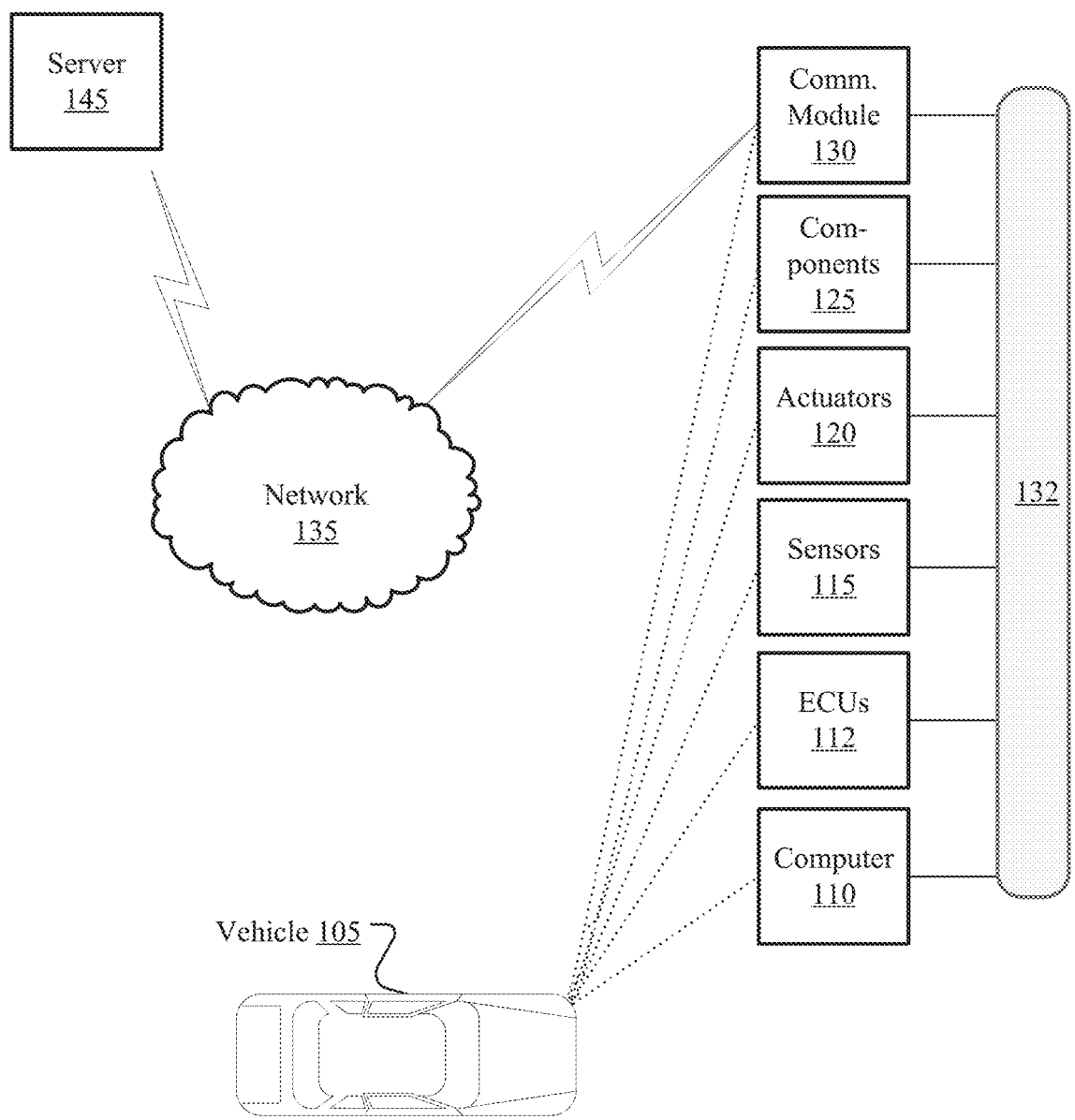
FIG. 1 is a block diagram of an example vehicle system.

Disclosed herein are vehicle operation improvements according to which changing roadway conditions can be taken into account in order to intelligently evaluate prospective engine power state transitions at a vehicle, typically in the context of an adaptive cruise control feature. As the vehicle travels along a roadway, it can analyze captured images, radar sensor data, and electronic horizon data to identify expected condition changes. Planned power state transitions can then be analyzed based on the identified expected condition changes. When expected condition change(s) will render a planned power state transition undesirable, the planned power state transition can be inhibited.

A system can comprise a computer having a processor and a memory, the memory storing instructions executable by the processor to monitor conditions of a roadway as a vehicle travels the roadway while an adaptive cruise control feature of the vehicle is active, identify an expected condition change based on the monitoring the conditions of the roadway, determine a preferred power state for an engine of the vehicle based on the expected condition change, determine that an engine power state transition is planned for the engine, the engine power state transition including transitioning the engine from a current power state to a planned power state, and resolve the engine power state transition based on the preferred power state.

The resolving the engine power state transition can comprise inhibiting the engine power state transition when the current power state matches the preferred power state.

The resolving the engine power state transition can comprise executing the engine power state transition when the current power state does not match the preferred power state and the planned power state matches the preferred power state.

The expected condition change can correspond to an expected movement out of a travel lane of the vehicle by a target vehicle of the adaptive cruise control feature.

The expected condition change can correspond to an expected movement into a travel lane of the vehicle by a target vehicle of the adaptive cruise control feature.

The expected condition change can correspond to a change in speed limit.

The expected condition change can correspond to a change in roadway curvature.

The engine power state transition can be a transition from an on state to an off state.

The engine power state transition can be a transition from an off state to an on state.

The memory can store instructions executable by the processor to determine a preferred fuel flow state for the engine based on the expected condition change and resolve a planned fuel flow state transition based on the preferred fuel flow state.

A method can comprise monitoring conditions of a roadway as a vehicle travels the roadway while an adaptive cruise control feature of the vehicle is active, identifying an expected condition change based on the monitoring the conditions of the roadway, determining a preferred power state for an engine of the vehicle based on the expected condition change, determining that an engine power state transition is planned for the engine, the engine power state transition including transitioning the engine from a current power state to a planned power state, and resolving the engine power state transition based on the preferred power state.

The resolving the engine power state transition can comprise inhibiting the engine power state transition when the current power state matches the preferred power state.

The resolving the engine power state transition can comprise executing the engine power state transition when the current power state does not match the preferred power state and the planned power state matches the preferred power state.

The expected condition change can correspond to an expected movement out of a travel lane of the vehicle by a target vehicle of the adaptive cruise control feature.

The expected condition change can correspond to an expected movement into a travel lane of the vehicle by a target vehicle of the adaptive cruise control feature.

The expected condition change can correspond to a change in speed limit.

The expected condition change can correspond to a change in roadway curvature.

The engine power state transition can be a transition from an on state to an off state.

The engine power state transition can be a transition from an off state to an on state.

The method can comprise determining a preferred fuel flow state for the engine based on the expected condition change and resolve a planned fuel flow state transition based on the preferred fuel flow state.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145 (V2V and V2I may be collectively referred to as V2X). The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) and cellular V2V (CV2V), cellular V2I or V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
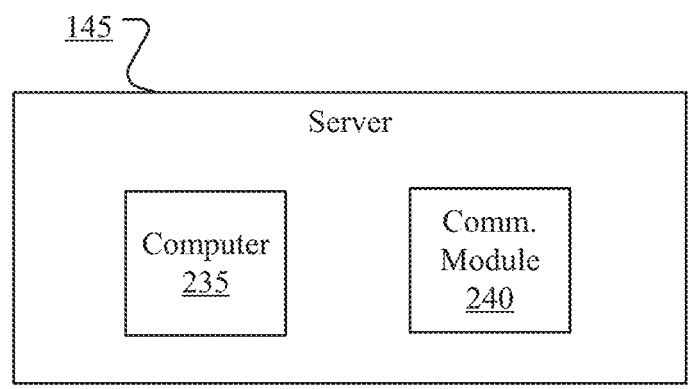
FIG. 2 is a block diagram of an example server computer.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links, e.g.

Figure 3:
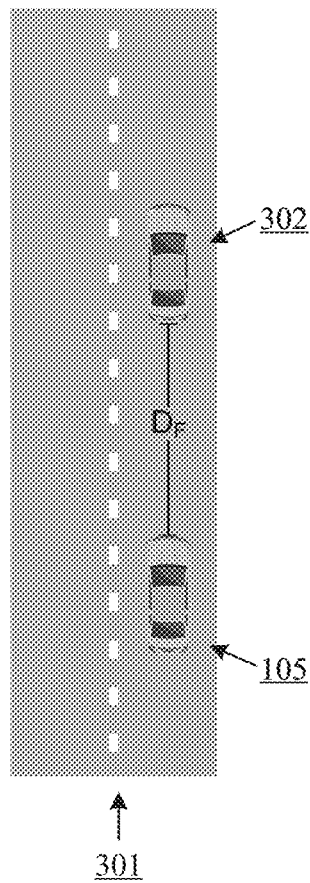
FIG. 3 is a diagram of an example traffic scene.

FIG. 3 is a diagram of an example traffic scene 300. In traffic scene 300, while an adaptive cruise control feature of vehicle 105 is engaged, vehicle 105 travels a roadway 301. While engaged, the adaptive cruise control feature of vehicle 105 can control vehicle propulsion power/acceleration in order to maintain a set speed when possible, while monitoring the road in front of vehicle 105 in order to detect other vehicles that may be present. The adaptive cruise control feature can monitor the road in front of vehicle 105 for the presence of other vehicle(s) based on sensor data provided by one or more sensors (e.g., one or more sensors 115).

In some implementations, the adaptive cruise control feature of vehicle 105 can use data provided by radar sensor(s) and camera(s) of vehicle 105 in order to detect the presence of other vehicles on roadway 301. In some implementations, using radar sensing data provided by radar sensor(s) of vehicle 105 (e.g., radar sensor(s) among sensors 115), radar-based object detection functionality of vehicle 105 (e.g., radar-based object detection functionality provided by computer 110 or an ECU 112) can detect objects (such as other vehicles) within range of those radar sensor(s). In some implementations, using images captured by camera(s) of vehicle 105 (e.g., camera(s) among sensors 115), image-based object detection functionality of vehicle 105 (e.g., image-based object detection functionality provided by computer 110 or an ECU 112) can visually detect/recognize objects (such as other vehicles) within visual range of those camera(s).

When the adaptive cruise control feature detects the presence of a vehicle in front of vehicle 105, it can, according to calculations that will be understood, determine whether vehicle 105, if it continues to travel at the set speed, will approach to within a specified minimum following distance from the detected vehicle. If so, the adaptive cruise control feature can temporarily reduce the speed of vehicle 105 below the set speed in order to prevent it from approaching any closer than the specified minimum following distance. In this context, the slower the speed of the leading vehicle in front of vehicle 105, the greater will be the extent to which the adaptive cruise control feature reduces the speed of vehicle 105. If the leading vehicle slows to a stop, the adaptive cruise control feature will cause vehicle 105 to also slow to a stop before it approaches closer than the specified minimum following distance.

In traffic scene 300, vehicle 105 travels roadway 301 with the adaptive cruise control feature engaged, and follows a vehicle 302. The adaptive cruise control feature controls engine power/acceleration at vehicle 105 in order to maintain, between vehicle 105 and vehicle 302, a specified minimum following distance. This specified minimum following distance can be a distance $D_F(s)$ that varies as a function of the speed of vehicle 105 (e.g., increases as the speed of vehicle 105 increases), and/or could be specified by user input, for example. Upon reaching traffic congestion 304 (e.g., a "traffic jam" consisting of stopped or slowly-moving vehicles), vehicle 302 may slow to a stop, and, in turn, the adaptive cruise control feature of vehicle 105 may cause vehicle 105 to slow to a stop (e.g., preserving a distance $D_F(0)$ between the front of vehicle 105 and the back of vehicle 302).

Vehicle 105 can include an electrical energy source (such as a battery) and an electric motor that can be powered by the electrical energy source to generate propulsion for vehicle 105. Vehicle 105 can also include an internal combustion engine that also can generate propulsion for vehicle 105. As vehicle 105 travels roadway 301, a power state of the engine can be controlled based on the power demands associated with propulsion of vehicle 105.

Factors affecting the power demands associated with propulsion of vehicle 105 can include route/surface metrics, such as road grade, road curvature, road surface friction (mu), rolling resistance, and roadway environmental conditions (e.g., the presence of rain, ice or snow). Factors affecting the power demands associated with propulsion of vehicle 105 can also include factors relating to vehicle load/configuration, such as vehicle weight, tire type, payload, towing of a trailer, and aerodynamic resistance (including the effects of headwinds or tailwinds, if present). Demands for propulsion power can also be affected by maneuvers of vehicle 105 as it travels roadway 301, such as lane changes and accelerations/decelerations to target speed.

At times during which the power demands can be accommodated solely using electrical power provided by the electrical energy source, the engine can be set to an 'off' power state. The engine can be set to an 'on' power state at times during which the available electrical power is insufficient to accommodate the power demands associated with vehicle propulsion.

The propulsion (and associated power demands) commanded by the adaptive cruise control feature can vary as the adaptive cruise control feature accelerates and decelerates vehicle 105 to adapt its speed as it travels roadway 301. If a current power state of the engine is unsuitable in view of those power demands, an engine power state transition can be planned (e.g., by computer 110 or an ECU 112) to transition the engine from its current power state to a different power state ("planned power state"). If the engine is on but is not needed to satisfy current power demands, the planned engine power state transition can be an engine pull-down, according to which the engine is transitioned to an 'off' power state. If the engine is off but current power demands necessitate sourcing power from the engine, the planned engine power state transition can be an engine pull-up, according to which the engine is transitioned to an 'on' power state.

In some cases, just as vehicle 105 is planning/executing an engine power state transition, conditions can change in a manner that renders that engine power state transition undesirable or unnecessary. For instance, just as vehicle 105 plans an engine pull-down in response to reduced power demand while vehicle 105 trails a slowly-moving vehicle, the slowly-moving vehicle may begin moving out of the travel lane of vehicle 105.

In some implementations, vehicle 105 can implement an engine control algorithm designed to inhibit engine power state transitions that are undesirable or unnecessary. In some implementations, vehicle 105 can monitor conditions of roadway 301 for condition changes that can potentially render planned engine power state transitions undesirable or unnecessary. In some implementations, based on such monitoring, vehicle 105 can identify an expected condition change. The expected condition change can be a condition change that appears likely to occur in view of information and/or data obtained in conjunction with monitoring conditions of roadway 301. In some implementations, vehicle 105 can monitor for condition changes by analyzing radar sensing data provided by radar sensor(s) of vehicle 105 and/or images captured by camera(s) of vehicle 105.

In some implementations, vehicle 105 can identify an expected condition change corresponding to an expected movement out of a travel lane of vehicle 105 on the part of a target vehicle of the adaptive cruise control feature. For instance, in the context of the above example, vehicle 105 can identify an expected condition change corresponding to an expected movement out of the travel lane of vehicle 105 on the part of the slowly-moving vehicle.

In some implementations, vehicle 105 can identify an expected condition change corresponding to an expected movement into a travel lane of the vehicle by a target vehicle of the adaptive cruise control feature. For instance, vehicle 105 can identify an expected condition change corresponding to an expected movement into the travel lane of vehicle 105 on the part of a vehicle traveling in an adjacent lane.

In some implementations, vehicle 105 can identify an expected condition change corresponding to a change in speed limit. For instance, vehicle 105 can determine that the speed limit of roadway 301 drops by 10 mph at an upcoming point along roadway 301. In some implementations, vehicle 105 can identify an expected condition change corresponding to a change in speed limit based on electronic horizon data. Electronic horizon data is a collection of data as is known obtained via vehicle sensors and/or stored map data indicating a current position or location of the vehicle 105 and predicting a future trajectory of the vehicle 105 with respect to an upcoming portion of roadway 301, e.g., including road geometry, topology, and attributes (e.g., lanes, speed limits, etc.). In an example, based on electronic horizon data, vehicle 105 can determine that the speed limit is 55 mph on a current road segment, but drops to 35 mph at roadway segment located ten segments forward from the current road segment.

In some implementations, vehicle 105 can identify an expected condition change corresponding to a change in roadway curvature. For instance, while vehicle 105 travels a straight portion of roadway 301, vehicle 105 can determine that it is approaching a curved portion of roadway 301. In some implementations, vehicle 105 can identify an expected condition change corresponding to a change in roadway curvature based on electronic horizon data. In an example, while traveling on a straight segment of roadway 301, vehicle 105 can determine that a roadway segment located ten segments forward has a curvature of radius 400 m.

In some implementations, having identified an expected condition change, vehicle 105 can determine a preferred power state for the engine based on that expected condition change. The preferred power state can be a power state that is appropriate for the power demands expected to be observed assuming that the expected condition change does in fact occur. For example, if the expected condition change corresponds to an expected movement of a slow-moving target vehicle from the travel lane of vehicle 105 to an adjacent lane, the preferred power state can be a power state that is appropriate for the power demands expected to be observed if the slow-moving target vehicle does actually move to the adjacent lane.

In some implementations, an engine controller of vehicle 105 may execute programming to plan engine power state transitions without reference to expected condition changes that may be identified as vehicle 105 travels along roadway 301. Such a planned engine power state transition can include transitioning the engine from its current power state to a planned power state. For example, the engine control logic may plan an engine pull-down or an engine pull-up without reference to any expected condition change that may have been identified.

In some implementations, an engine power state transition planned without reference to an expected condition change can be resolved based on a preferred power state determined based on the expected condition change. Resolving the planned engine power state transition can include inhibiting the planned engine power state transition if the current power state matches the preferred power state (such that the current power state is expected to be appropriate), and executing the planned engine power state transition if the current power state does not match the preferred power state and the planned power state matches the preferred power state (such that the planned power state is expected to be appropriate).

In an example, the engine control logic may plan an engine pull-down while vehicle 105 trails a slowly-moving target vehicle in the travel lane of vehicle 105. Based on an expected movement of the slowly-moving target vehicle out of the travel lane and into an adjacent lane, it may be determined that the engine should preferably remain in an 'on' power state. The engine pull-down may then be inhibited to prevent the engine from being transitioned to an 'off' power state.

In another example, the engine control logic may plan an engine pull-up while the travel lane in front of vehicle 105 is clear. Based on an expected movement of a target vehicle into the travel lane in front of vehicle 105, it may be determined that the engine should preferably remain in an 'off' power state. The engine pull-up may then be inhibited to prevent the engine from being transitioned to an 'on' power state.

In some implementations, vehicle 105 can take information regarding road grade/inclination into account in conjunction with controlling engine power state transitions. In some implementations, vehicle 105 can obtain information regarding road grade/inclination from electronic horizon data provided by one or more data providers/services. In some implementations, as it travels a given roadway (e.g., roadway 301), vehicle 105 can determine—e.g., based on electronic horizon data—whether the road grade will change at upcoming points along the roadway, and if so, can take such change(s) into account. For instance, vehicle 105 may inhibit a planned engine pull-up or initiate an engine pull-down based (and/or deceleration fuel shut off) on a determination that the road grade will change from a level grade to a downward grade at an upcoming point.

In some implementations, vehicle 105 can consider most-probable path (MPP) determinations in conjunction with controlling engine power state transitions using information regarding road grade/inclination. For example, if an MPP determined for vehicle 105 involves a turn onto a road with a steep upward or downward grade, vehicle 105 can initiate an engine pull-up or pull-down (and/or deceleration fuel shut off) in advance of the turn.

Figure 4:
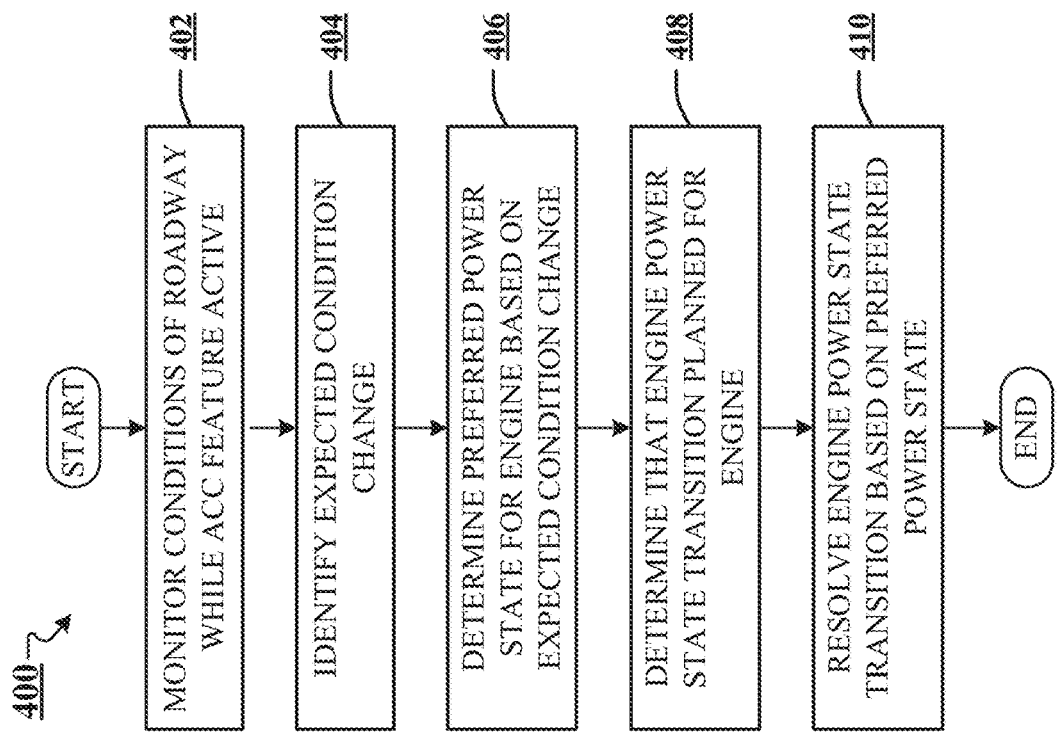
FIG. 4 is a block diagram of a first example process flow.

FIG. 4 is a block diagram of a process flow 400, which may be representative of operations executed in various implementations. As shown in process flow 400, conditions of a roadway can be monitored at 402 as a vehicle travels the roadway while an adaptive cruise control feature of the vehicle is active. At 404, an expected condition change can be identified based on the monitoring at 402. At 406, a preferred power state for an engine of the vehicle can be determined based on the expected condition change identified at 404. At 408, it can be determined that an engine power state transition is planned for the engine. At 410, the planned engine power state transition can be resolved based on the preferred power state determined at 406.

Figure 5:
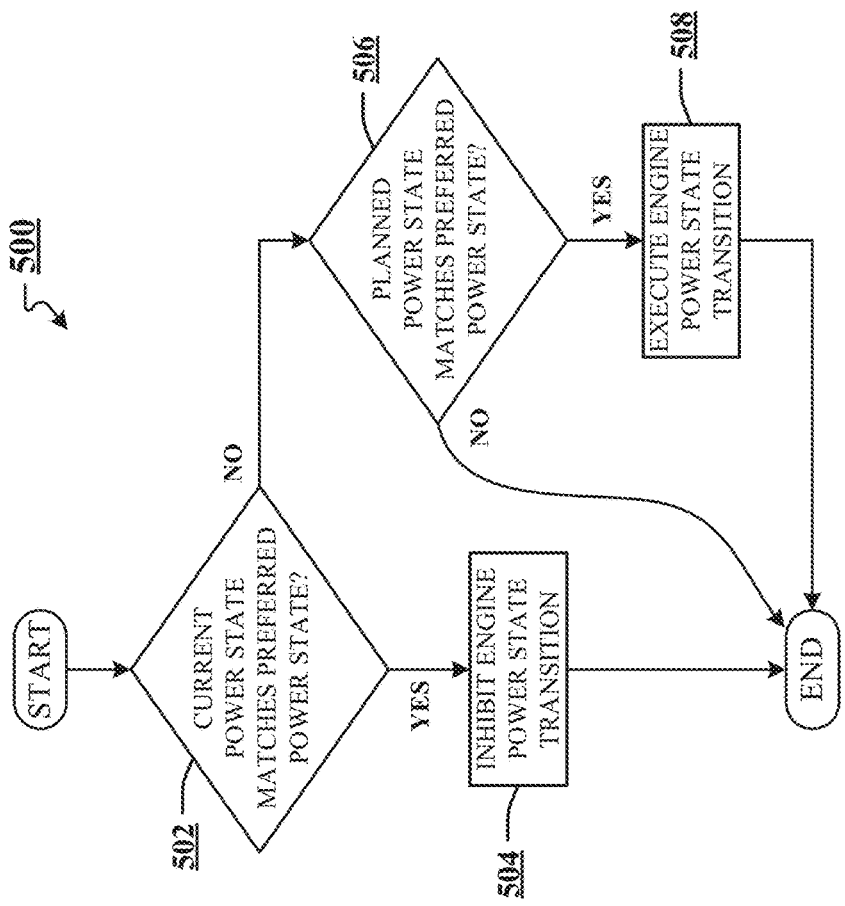
FIG. 5 is a block diagram of a second example process flow.

FIG. 5 is a block diagram of a process flow 500, which may be representative of operations executed in various implementations. In some implementations, process flow 500 can be used to resolve the planned engine power state transition at 410 in process flow 400 of FIG. 4. As shown in process flow 500, a determination can be made at 502 of whether the current power state matches the preferred power state. If it is determined at 502 that the current power state matches the preferred power state, the engine power state transition can then be inhibited at 504, after which the process flow can end. If it is determined at 502 that the current power state does not match the preferred power state, a determination can be made at 506 of whether the planned power state matches the preferred power state. If it is determined at 506 that the planned power state does not match the preferred power state, the process flow can end. If it is determined at 506 that the planned power state matches the preferred power state, the engine power state transition can then be executed at 508, after which the process flow can end.

Figure 6:
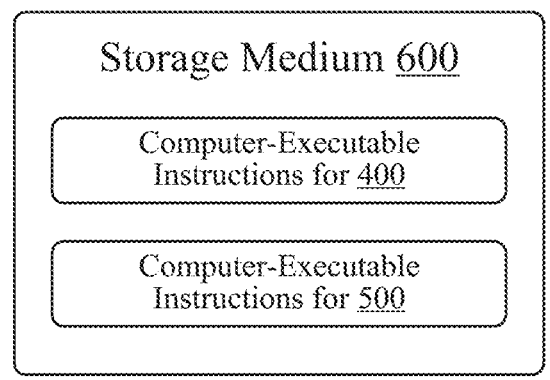
FIG. 6 is a block diagram of an example storage medium.

FIG. 6 illustrates an example storage medium 600. Storage medium 600 may be any non-transitory computer-readable storage medium or machine-readable storage medium, such as an optical, magnetic or semiconductor storage medium. In various implementations, storage medium 600 may be an article of manufacture. In some implementations, storage medium 600 may store computer-executable instructions, such as computer-executable instructions to implement one or both of process flows 400 and 500. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
   a computer having a processor and a memory, the memory storing instructions executable by the processor to:
   monitor conditions of a roadway as a vehicle travels the roadway while an adaptive cruise control feature of the vehicle is active;
   identify an expected condition change based on the monitoring the conditions of the roadway;
   determine a preferred power state for an engine of the vehicle based on the expected condition change;
   determine that an engine power state transition is planned for the engine, the engine power state transition including transitioning the engine from a current power state to a planned power state; and
   resolve the engine power state transition based on the preferred power state.

2. The system of claim 1, wherein the resolving the engine power state transition comprises inhibiting the engine power state transition when the current power state matches the preferred power state.

3. The system of claim 1, wherein the resolving the engine power state transition comprises executing the engine power state transition when the current power state does not match the preferred power state and the planned power state matches the preferred power state.

4. The system of claim 1, wherein the expected condition change corresponds to an expected movement out of a travel lane of the vehicle by a target vehicle of the adaptive cruise control feature.

5. The system of claim 1, wherein the expected condition change corresponds to an expected movement into a travel lane of the vehicle by a target vehicle of the adaptive cruise control feature.

6. The system of claim 1, wherein the expected condition change corresponds to a change in speed limit.

7. The system of claim 1, wherein the expected condition change corresponds to a change in roadway curvature.

8. The system of claim 1, wherein the current power state is an on state and the planned power state is an off state.

9. The system of claim 1, wherein the current power state is an off state and the planned power state is an on state.

10. The system of claim 1, the memory storing instructions executable by the processor to:
    determine a preferred fuel flow state for the engine based on the expected condition change; and
    resolve a planned fuel flow state transition based on the preferred fuel flow state.

11. A method, comprising:
    monitoring conditions of a roadway as a vehicle travels the roadway while an adaptive cruise control feature of the vehicle is active;
    identifying an expected condition change based on the monitoring the conditions of the roadway;
    determining a preferred power state for an engine of the vehicle based on the expected condition change;
    determining that an engine power state transition is planned for the engine, the engine power state transition including transitioning the engine from a current power state to a planned power state; and
    resolving the engine power state transition based on the preferred power state.

12. The method of claim 11, wherein the resolving the engine power state transition comprises inhibiting the engine power state transition when the current power state matches the preferred power state.

13. The method of claim 11, wherein the resolving the engine power state transition comprises executing the engine power state transition when the current power state does not match the preferred power state and the planned power state matches the preferred power state.

14. The method of claim 11, wherein the expected condition change corresponds to an expected movement out of a travel lane of the vehicle by a target vehicle of the adaptive cruise control feature.

15. The method of claim 11, wherein the expected condition change corresponds to an expected movement into a travel lane of the vehicle by a target vehicle of the adaptive cruise control feature.

16. The method of claim 11, wherein the expected condition change corresponds to a change in speed limit.

17. The method of claim 11, wherein the expected condition change corresponds to a change in roadway curvature.

18. The method of claim 11, wherein the current power state is an on state and the planned power state is an off state.

19. The method of claim 11, wherein the current power state is an off state and the planned power state is an on state.

20. The method of claim 11, comprising:
    determining a preferred fuel flow state for the engine based on the expected condition change; and
    resolving a planned fuel flow state transition based on the preferred fuel flow state.

* * * * *